US012746486B2

(12) United States Patent
Lee et al.

(10) Patent No.: US 12,746,486 B2
(45) Date of Patent: Sep. 29, 2026

(54) SEAWATER DESALINATION EQUIPMENT

(71) Applicant: MANZEON CO., LTD., Gyeonggi-do (KR)

(72) Inventors: Sang Cheol Lee, Gyeonggi-do (KR); Dongjoo Lee, Gyeonggi-do (KR)

(73) Assignee: MANZEON CO., LTD., Gyeonggi-do (KR)

( * ) Notice: Subject to any disclaimer, the term of this patent is extended or adjusted under 35 U.S.C. 154(b) by 158 days.

(21) Appl. No.: 18/694,577

(22) PCT Filed: Oct. 7, 2022

(86) PCT No.: PCT/KR2022/015223
§ 371 (c)(1),
(2) Date: Mar. 22, 2024

(87) PCT Pub. No.: WO2023/063669
PCT Pub. Date: Apr. 20, 2023

(65) Prior Publication Data

US 2024/0399270 A1 Dec. 5, 2024

(30) Foreign Application Priority Data

Oct. 14, 2021 (KR) ........................ 10-2021-0136824

(51) Int. Cl.
*C02F 1/04* (2023.01)
*B01D 1/00* (2006.01)
(Continued)

(52) U.S. Cl.
CPC ........... *B01D 5/006* (2013.01); *B01D 1/0047* (2013.01); *B01D 1/0076* (2013.01); *B01D 1/10* (2013.01);
(Continued)

(58) Field of Classification Search
CPC ..... C02F 1/048; B01D 1/0047; B01D 1/0076; B01D 1/10; B01D 5/003; B01D 5/0051; B01D 5/006
See application file for complete search history.

(56) References Cited

U.S. PATENT DOCUMENTS 3,783,108 A * 1/1974 Koivisto ............ B01D 19/0068 203/91
4,302,297 A * 11/1981 Humiston ................. C02F 1/16 202/205
(Continued)

FOREIGN PATENT DOCUMENTS

CA 3142006 A1 * 3/2022 .............. G01M 3/30
CN 101698518 A 4/2010
(Continued)

OTHER PUBLICATIONS

International Search Report, English Translation, and Written Opinion issued in corresponding International Application PCT/KR2022/015223, mailed Jan. 19, 2023, 10 pages.
(Continued)

*Primary Examiner* — Jonathan Miller
(74) *Attorney, Agent, or Firm* — Burris Law, PLLC

(57) ABSTRACT

Seawater desalination equipment includes a gas generation unit for generating gas from seawater by evaporating the seawater, a condensation unit for receiving and condensing the gas to generate freshwater, a cooling unit, a gas storage unit connected to the condensation unit and storing gas that has passed through the condensation unit, a vacuum pump, and a control unit for operating the vacuum pump that is configured to discharge the gas stored in the gas storage unit to an outside area when an internal gas pressure difference between the condensation unit and the gas storage unit is within a predetermined range. The condensation unit includes a condensation pipe having a zigzag shape and
(Continued)

through which the gas passes. The cooling unit supplies the seawater to the outer surface of the condensation pipe to lower a temperature of the condensation pipe by evaporating the seawater.

13 Claims, 11 Drawing Sheets

(51) Int. Cl.

| | |
|---|---|
| ***B01D 1/10*** | (2006.01) |
| ***B01D 5/00*** | (2006.01) |
| *C02F 103/08* | (2006.01) |

(52) U.S. Cl.

CPC ......... *B01D 5/0003* (2013.01); *B01D 5/0051* (2013.01); *C02F 1/048* (2013.01); *C02F 2103/08* (2013.01)

(56) References Cited

U.S. PATENT DOCUMENTS

| | | | | |
|---|---|---|---|---|
| 4,494,967 | A * | 1/1985 | Barth | B05B 14/49 95/193 |
| 5,466,344 | A * | 11/1995 | Lindke | B01D 3/10 210/260 |
| 6,936,140 | B2 * | 8/2005 | Paxton | C02F 1/04 159/901 |
| 7,811,420 | B2 * | 10/2010 | Sonander | C02F 1/20 203/1 |
| 7,832,714 | B2 * | 11/2010 | Duesel, Jr. | C02F 1/14 261/123 |
| 8,277,614 | B2 * | 10/2012 | Alhazmy | C02F 1/048 203/88 |
| 9,028,653 | B2 * | 5/2015 | Kwak | B01D 1/26 202/195 |
| 11,465,068 | B2 * | 10/2022 | Alsaadi | B01D 3/42 |
| 11,466,912 | B2 | 10/2022 | Bradshaw et al. | |
| 2008/0173590 | A1 * | 7/2008 | Duesel | B01D 1/14 210/519 |
| 2009/0173617 | A1 * | 7/2009 | Wilson | B01D 1/0076 202/234 |
| 2010/0078306 | A1 * | 4/2010 | Alhazmy | C02F 1/048 202/172 |
| 2011/0000778 | A1 * | 1/2011 | Kwak | C02F 1/16 202/185.1 |
| 2013/0270100 | A1 * | 10/2013 | Kwak | B01D 1/26 202/174 |
| 2021/0178281 | A1 * | 6/2021 | Alsaadi | C02F 1/06 |

FOREIGN PATENT DOCUMENTS

| | | | |
|---|---|---|---|
| CN | 205873939 | U | 1/2017 |
| CN | 111433534 | A | 7/2020 |
| KR | 100982053 | B1 | 9/2010 |
| KR | 1020110003760 | A | 1/2011 |
| KR | 1020110080215 | A | 7/2011 |
| KR | 1020150119997 | A | 10/2015 |
| KR | 101628819 | B1 | 6/2016 |
| KR | 1020160125224 | A | 10/2016 |
| KR | 1020180006356 | A | 1/2018 |
| KR | 102048192 | B1 | 11/2019 |
| WO | 2015064781 | B1 | 5/2015 |

OTHER PUBLICATIONS

Notice of Allowance issued in corresponding KR Application 10-2021-0136824, issued Feb. 27, 2024, and English translation thereof, 4 pages.

Office Action issued in corresponding CN Application No. 202280068820.7, issued Jul. 1, 2026, and an English translation, 16 pages.

* cited by examiner

SEAWATER DESALINATION EQUIPMENT

CROSS-REFERENCE TO RELATED APPLICATIONS

This application is a U.S. National Phase Application of PCT/KR2022/015223, filed Oct. 7, 2022, which claims priority to Korean Patent Application No. 10-2021-0136824, filed on Oct. 14, 2021, the contents of which are hereby incorporated by reference in their entirety.

FIELD

The present disclosure relates to seawater desalination equipment that uses natural energy to improve energy efficiency and prevent marine pollution by extracting freshwater, salt, and minerals together.

BACKGROUND

As the global population continues to increase and freshwater resources of the earth become limited, efforts have been constantly made to efficiently secure freshwater for human consumption. Because more than 97% of the water on the earth exists in the form of seawater, techniques of desalting seawater by separating solutes from seawater have been studied as a fundamental method for solving the water shortage problem.

Freshwater is obtained from seawater by removing substances dissolved in or floating on seawater to an extent satisfying water quality standards or drinking water quality standards. Methods such as an evaporation method, a membrane separation method, an electrodialysis method, and a freezing method are commonly known as seawater desalination methods, and the evaporation method and the membrane separation method are most widely used.

Typical examples of the evaporation method include a multiple stage flash (MSF) method and a multiple effect distillation (MED) method. Although the methods mentioned above have been widely used since relatively early times, these methods have many disadvantages such as high energy consumption, frequent corrosion caused by high-temperature operations, large production facility areas, and high initial investment costs. Thus, large-scale seawater desalination facilities have been mainly used only in the energy-rich countries in the Middle East.

A reverse osmosis method, which is a typical example of the membrane separation method, is performed by separating ionic substances and pure water from seawater using a reverse osmosis membrane. In the reverse osmosis method, a pressure greater than or equal to osmotic pressure is required to separate ionic substances and pure water from seawater, and this pressure is referred to as a reverse osmotic pressure. The reverse osmosis method has disadvantages such as significantly high energy consumption caused by the use of a high-pressure pump in seawater desalination, high initial investment costs for large-scale seawater desalination, and very finicky pretreatment for preventing fouling caused by organic or inorganic substances.

Accordingly, various methods have been developed to solve the problems of conventional seawater-desalination techniques. For example, a disclosed seawater desalination method and apparatus enable a low-pressure process compared to existing seawater desalination methods by employing a pretreatment process for preventing scale problems in advance. In addition, a disclosed seawater desalination method and apparatus are disclosed increase the total freshwater recovery rate of a system and increase the lifespan of a separation membrane used in processes. In addition, a disclosed seawater desalination method and apparatus reduce system operating costs and increase energy efficiency and production efficiency.

However, all of such seawater desalination apparatuses of the related art have disadvantages such as high costs because of high energy consumption for converting seawater into freshwater or constant replacement of some facilities. Because of such disadvantages, many efforts and resources are required for seawater desalination.

Moreover, in seawater desalination apparatuses of the related art, seawater remaining after freshwater is obtained by separating solutes from the seawater is not recycled but is dumped into the sea, thereby polluting the marine environment.

SUMMARY

The present disclosure is provided to address the problems described above. A technical objective of the present disclosure is to provide seawater desalination equipment that uses natural energy to increase energy efficiency and prevent marine pollution by extracting freshwater, salt, and minerals at the same time.

To achieve the objectives, the present disclosure provides seawater desalination equipment including: a gas generation unit configured to generate gas from seawater by evaporating the seawater; a condensation unit configured to receive the gas from the gas generation unit and condense the gas to generate freshwater; a cooling unit configured to lower a temperature of the condensation unit by evaporating seawater; a gas storage unit connected to the condensation unit and storing gas that has passed through the condensation unit; a vacuum pump configured to discharge the gas stored in the gas storage unit to an outside area; and a control unit configured to operate the vacuum pump to discharge the gas stored in the gas storage unit to the outside area when an internal gas pressure difference between the condensation unit and the gas storage unit is within a predetermined range, wherein the condensation unit includes a condensation pipe curved in a "U" shape and through which gas passes, and the cooling unit supplies seawater to an outer surface of the condensation pipe to lower a temperature of the condensation pipe by evaporation of the seawater.

In the seawater desalination equipment, the condensation pipe may include a plurality of pipes connected to each other and through which gas flows.

In the seawater desalination equipment, a freshwater transfer pipe may be connected to a lower end of each of the plurality of pipes to transfer freshwater to a freshwater storage tank.

In the seawater desalination equipment, the cooling unit may include: an evaporation seawater supply portion disposed at an upper end of each of the plurality of pipes to allow seawater to flow down along an outer surface of the pipe in a length direction of the pipe; an evaporation seawater storage portion disposed at a lower end of each of the plurality of pipes to store seawater remaining without evaporating; and a seawater transfer pipe configured to transfer seawater stored in the evaporation seawater storage portion to a seawater storage tank.

The seawater desalination equipment may further include evaporation fabric wrapped around the outer surface of the pipe between the evaporation seawater supply portion and the evaporation seawater storage portion to absorb seawater supplied from the evaporation seawater supply portion.

In the seawater desalination equipment, the gas generation unit may include an evaporation portion in which seawater evaporates, a heat exchange portion configured to exchange heat with a heat source to provide heated seawater to the evaporation portion, and a gas supply pipe configured to provide steam generated in the evaporation portion to the condensation unit.

In the seawater desalination equipment, the evaporation portion may include: an evaporation body in which a receiving space is formed to receive seawater and having a side into which the heat exchange portion is inserted; and a water level sensor configured to measure a seawater level inside the evaporation body, wherein the heat exchange portion may include: a heat exchange pipe having an end inserted in the evaporation body and another end protruding outward from the evaporation body; and a heat source portion into which the heat exchange pipe is inserted, the heat source portion being filed with the heat source that exchanges heat with seawater contained in the heat exchange pipe.

In the seawater desalination equipment, a concentrated seawater storage portion may be connected to a lower portion of the evaporation body to store seawater concentrated by evaporation.

In the seawater desalination equipment, the heat source portion may include: a plurality of heat source pipes horizontally extending in a loop shape; a heat supply pipe connecting corners of the plurality of heat source pipes to each other; and heat-source water filled in the plurality of heat source pipes and the heat supply pipe, wherein the heat exchange pipe may be inserted in the heat supply pipe.

In the seawater desalination equipment, the condensation unit and the gas storage unit may be connected to each other through a gas connection line that is provided with a valve configured to control gas flow, and when a temperature of gas in the condensation unit is less than or equal to a predetermined range, the control unit may operate the valve to allow the gas in the condensation unit to flow to the gas storage unit.

In the seawater desalination equipment, a moisture remover may be provided in the gas storage unit to remove only moisture from gas.

In the seawater desalination equipment, the gas storage unit may include a moisture remover solution discharge pipe to discharge a moisture remover solution in which moisture is absorbed.

Seawater desalination equipment includes: a gas generation unit configured to generate gas from seawater by evaporating the seawater; a condensation unit configured to receive the gas from the gas generation unit and condense the gas to generate freshwater; a cooling unit configured to lower a temperature of the condensation unit by evaporating seawater absorbed in evaporation fabric wrapped around the condensation unit; a gas storage unit connected to the condensation unit and storing gas that has passed through the condensation unit; a vacuum pump configured to discharge the gas stored in the gas storage unit to an outside area; and a control unit configured to operate the vacuum pump to discharge the gas stored in the gas storage unit when an internal gas pressure difference between the condensation unit and the gas storage unit is within a predetermined range, wherein the condensation unit includes a condensation pipe having a "U" shape and through which gas passes, and the condensation pipe includes a plurality of pipes connected to each other and through which gas flows.

In the seawater desalination equipment, a freshwater transfer pipe may be connected to a lower end of each of the plurality of pipes to transfer freshwater, and a compensation circuit may be connected to the freshwater transfer pipe to allow freshwater to flow through the freshwater transfer pipe.

The seawater desalination equipment of the present disclosure has an advantage of increasing energy efficiency by intactly using natural energy to obtain freshwater from seawater vapor in the condensation unit.

In addition, the seawater desalination equipment is environmentally friendly and prevents marine pollution because concentrated seawater remaining after extracting freshwater is not dumped into the sea but is used to extract salt and minerals.

DRAWINGS

DETAILED DESCRIPTION

Figure 1:
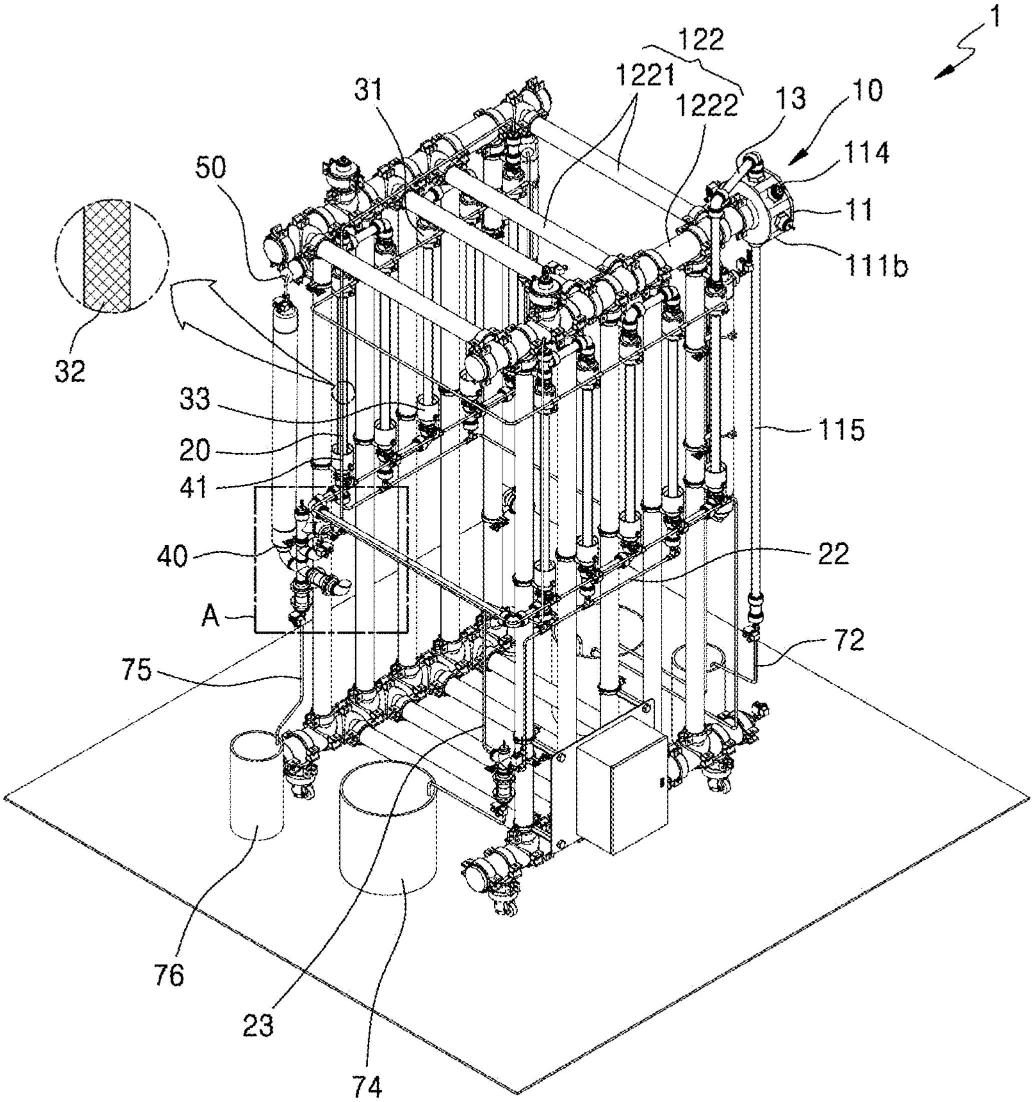
FIG. 1 is a rear perspective view illustrating seawater desalination equipment according to an embodiment of the present disclosure.
Figure 2:
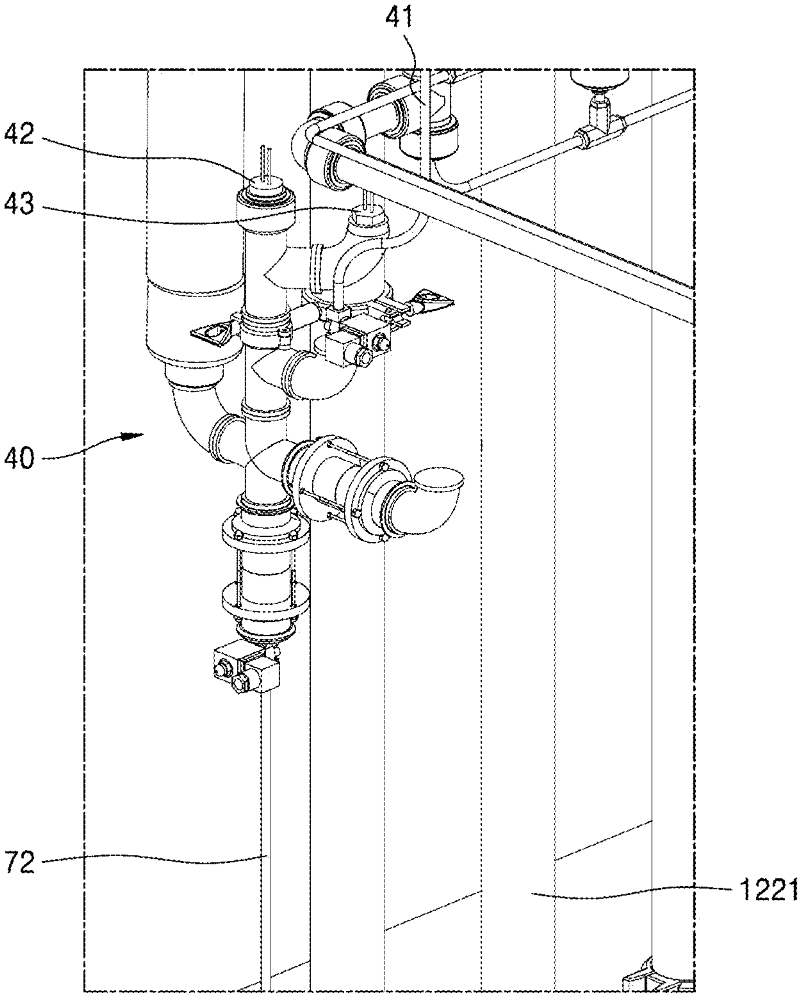
FIG. 2 is an enlarged view illustrating portion "A" in FIG. 1.
Figure 3:
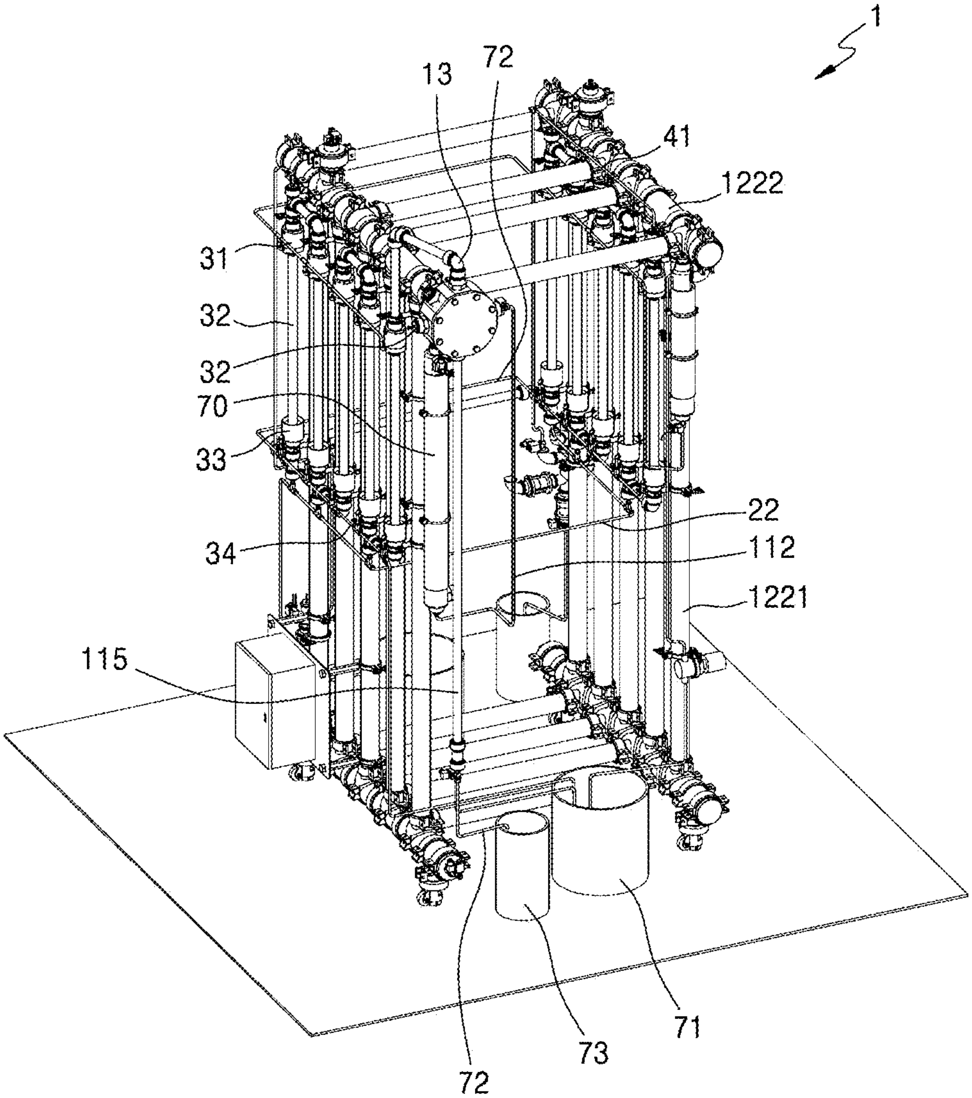
FIG. 3 is a front perspective view illustrating the seawater desalination equipment of FIG. 1.
Figure 4:
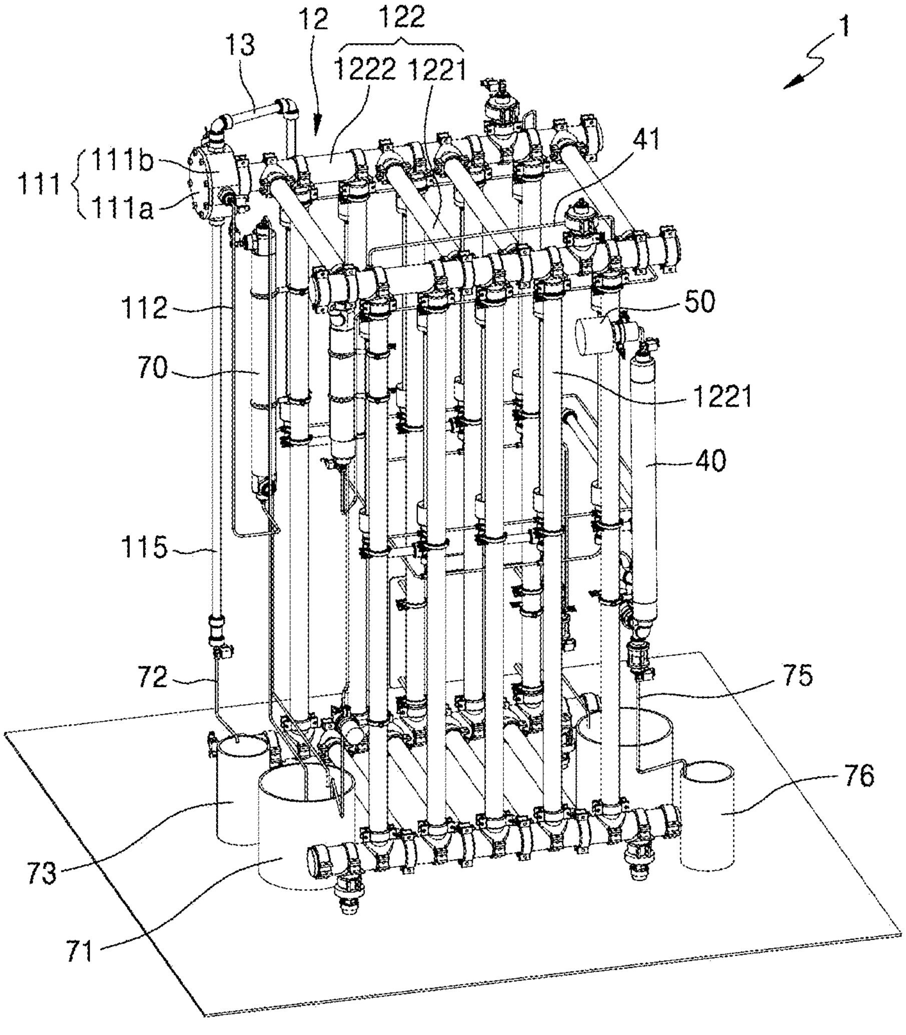
FIG. 4 is a side perspective view illustrating the seawater desalination equipment of FIG. 1.
Figure 5:
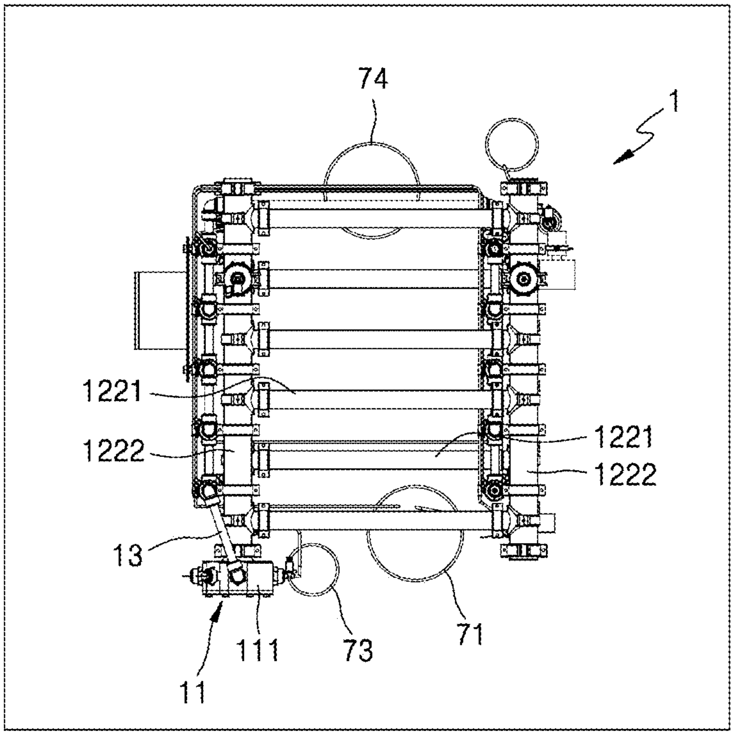
FIG. 5 is a plan view illustrating the seawater desalination equipment of FIG. 1.
Figure 6:
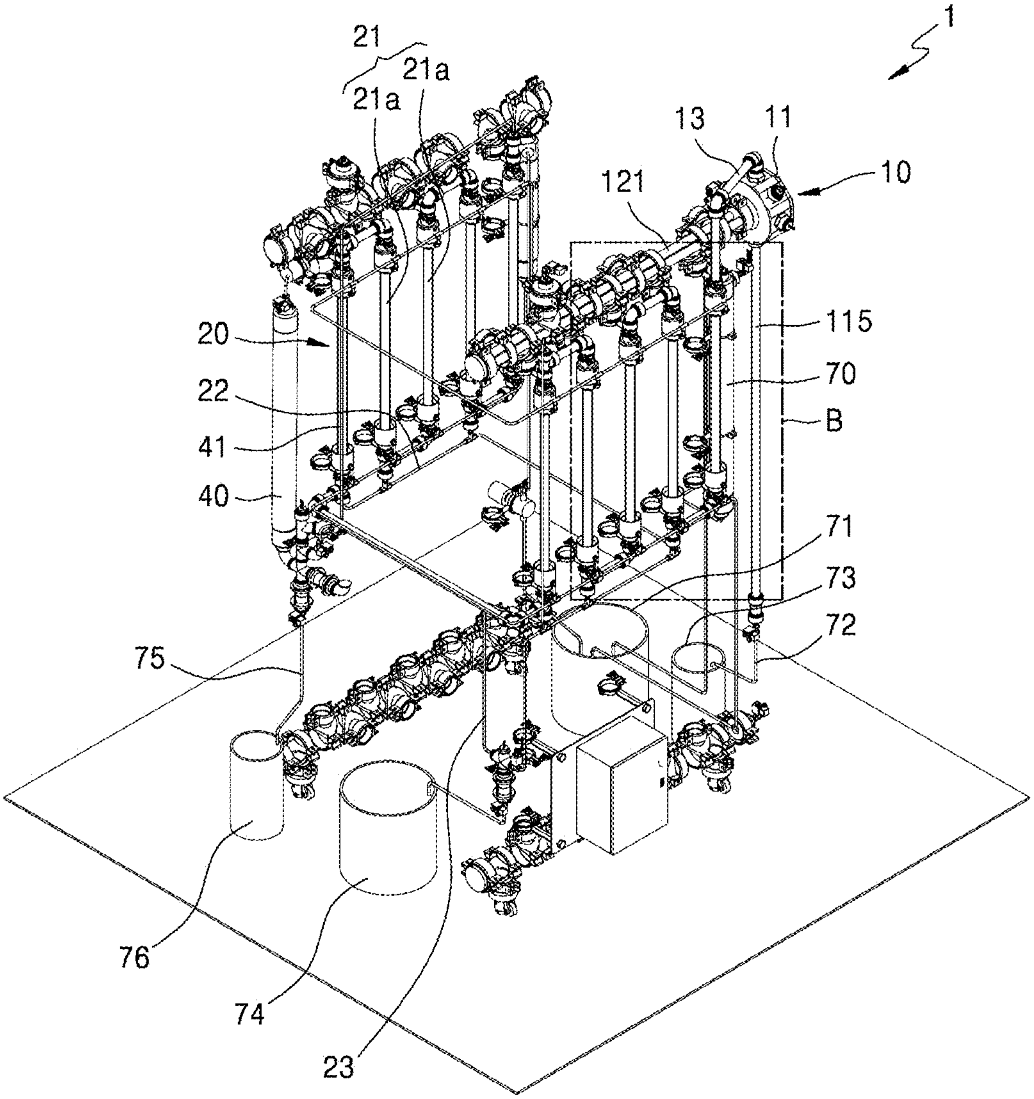
FIG. 6 is a partial exploded perspective view illustrating the seawater desalination equipment of FIG. 1.
Figure 7:
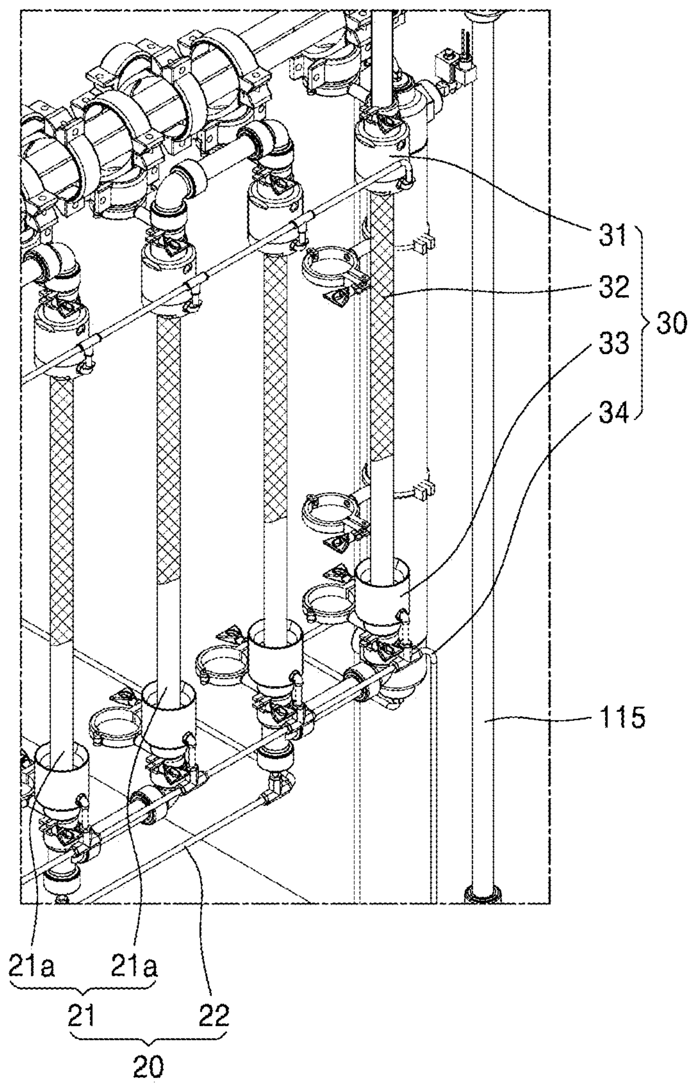
FIG. 7 is an enlarged view illustrating portion "B" of FIG. 6.
Figure 8:
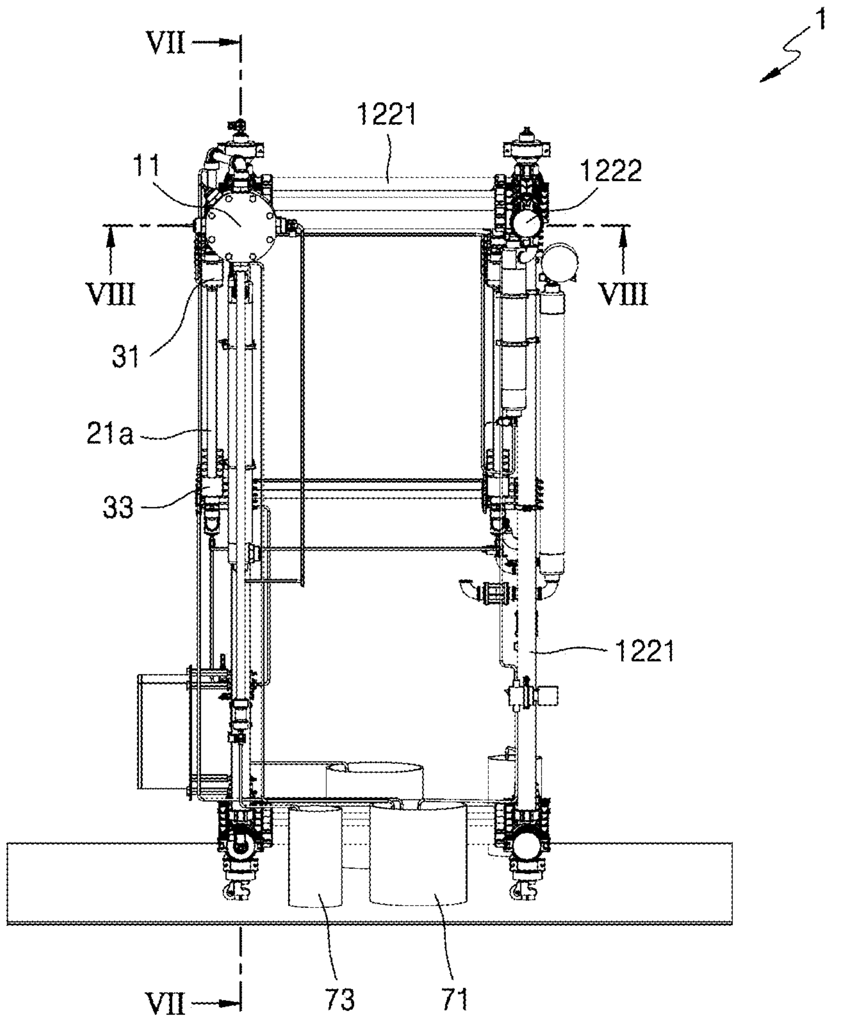
FIG. 8 is a side view illustrating the seawater desalination equipment of FIG. 1.
Figure 9:
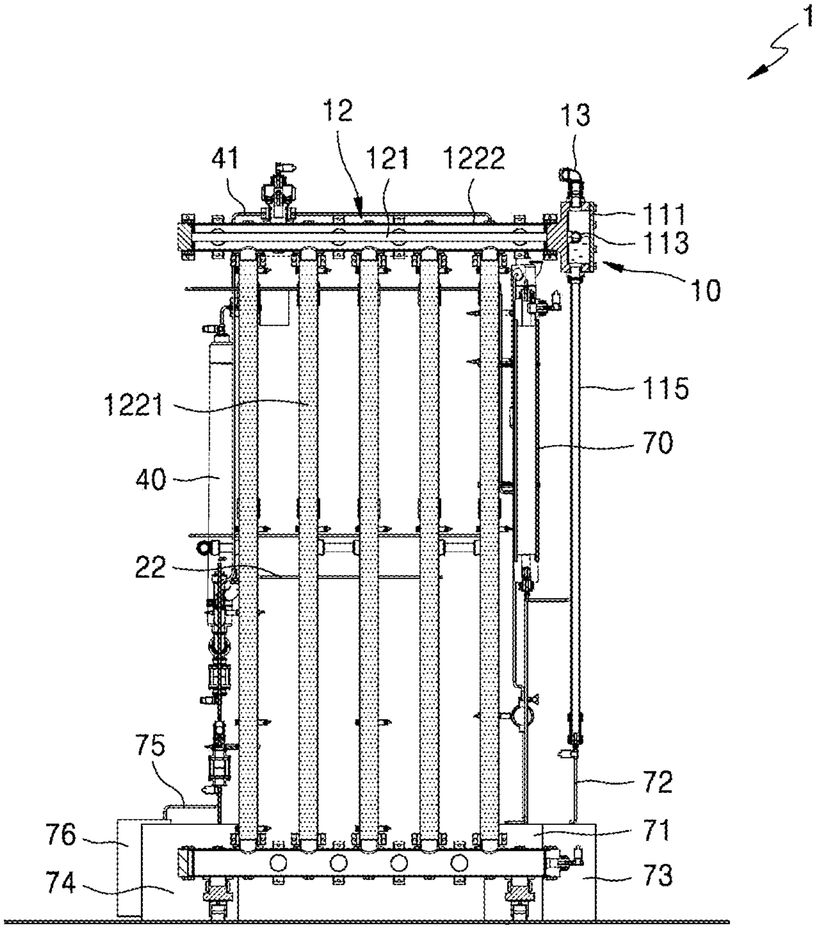
FIG. 9 is a cross-sectional view taken along line IX-IX of FIG. 8.
Figure 10:
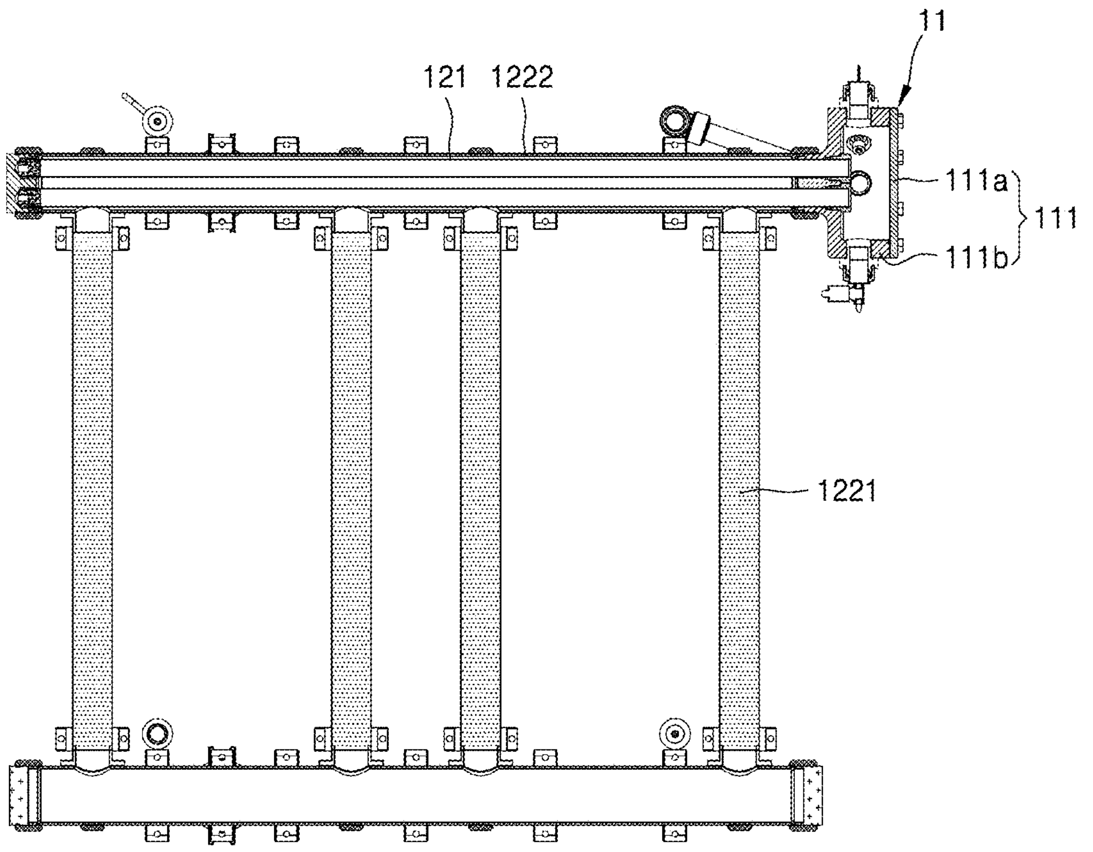
FIG. 10 is a cross-sectional view taken along line X-X of FIG. 8.
Figure 11:
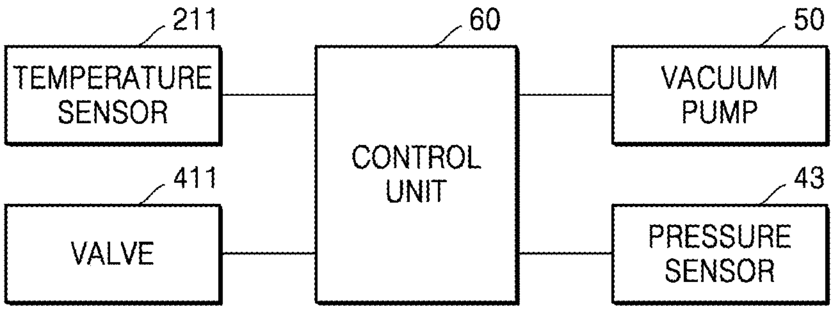
FIG. 11 is a control block diagram illustrating the seawater desalination equipment of FIG. 1.

Hereinafter, preferred embodiments of the present disclosure will be described with reference to the accompanying drawings. However, technical ideas of the present disclosure are not limited to the embodiments set forth herein and may be embodied in other forms. The embodiments set forth herein are provided so that this disclosure will be thorough and complete, and will fully convey the concept of the present disclosure to those skilled in the art.

In the present specification, it will be understood that when an element is referred to as being "above" or "on" another element, it can be directly on the other element, or intervening elements may also be present. Furthermore, in the drawings, the thicknesses of layers and regions may be exaggerated for effective illustrations of technical issues.

In addition, although terms such as "first," "second," and "third" are used to describe various elements in various embodiments of the present disclosure, these elements should not be limited by these terms. These terms are only used to distinguish one element from another element. Thus, an element referred to as a first element in an embodiment may be referred to as a second element in another embodiment. Each embodiment described herein includes a complementary embodiment thereof. In addition, the term "and/or" used herein refers to one or more of the associated listed items.

The terms of a singular form may include plural forms unless otherwise mentioned. In addition, the term "include" or "comprise" used herein specifies the presence of a property, a fixed number, a step, a process, an element, a component, and a combination thereof, but does not exclude the presence or addition of other properties, fixed numbers, steps, processes, elements, components, and combinations thereof. In addition, the meaning of "connection" includes indirect connection between a plurality of elements, and direct connection between a plurality of elements.

In seawater desalination equipment of the present disclosure, seawater vapor flowing in a condensation pipe is condensed into freshwater by a cooling effect occurring by seawater flowing and evaporating outside the condensation pipe owing to solar heat and wind, thereby minimizing energy consumption for seawater desalination.

Seawater evaporates in a vacuum-state gas generation unit of the seawater desalination equipment as the seawater is heated through heat exchange with a heat source heated by external heat, and thus a large amount of seawater may be easily converted into vapor.

Furthermore, in the seawater desalination equipment of the present disclosure, gases such as nitrogen and oxygen other than vapor that are generated during evaporation of seawater and hinder the condensation of vapor are stored in a separate gas storage unit and are then discharged to the outside using a vacuum pump, thereby minimizing a condensation efficiency decrease with time and guaranteeing high desalination efficiency using a small amount of energy.

Furthermore, the present disclosure provides a concentrated seawater storage to store seawater that is concentrated while the seawater evaporates in the gas generation unit. Thus, salt or minerals contained in the concentrated seawater may be easily extracted, and seawater desalination costs may be decreased by obtaining profit from the salt and minerals.

That is, according to the present disclosure, energy necessary for desalting seawater is obtained mainly from natural energy such as solar heat and wind to effectively reduce energy consumption for seawater desalination, and salt and minerals generated during the desalination process are separately collected and used. Thus, the overall cost required for seawater desalination may be reduced. In addition, marine pollution is prevented because highly concentrated seawater is not dumped into the sea.

The seawater desalination equipment of the present disclosure will now be described in detail with reference to the accompanying drawings.

Seawater desalination equipment 1 of the present disclosure includes a gas generation unit 10, a condensation unit 20, a cooling unit 30, a gas storage unit 40, a vacuum pump 50, and a control unit 60.

The gas generation unit 10 produces gas from seawater by evaporating the seawater. The gas generation unit 10 includes an evaporation portion 11, a heat exchange portion 12, and a gas supply pipe 13.

The evaporation portion 11 includes an evaporation body 111. The evaporation body 111 has a stand-type cylindrical shape and include a pair of disks 111_a_ and a side wall portion 111_b_ connecting edges of the disks 111_a_ to each other. A receiving space is provided in the evaporation body 111 to receive seawater. The evaporation body 111 is filled with seawater up to a medium height, and in the evaporation portion 11, only the water component of seawater, excluding minerals, evaporates into water vapor.

The heat exchange portion 12 is inserted into center portions of the disks 111_a_ of the evaporation body 111. In addition, a desalination seawater transfer pipe 112 connected to a desalination seawater storage tank 70 is connected to a middle position of a side of the side wall portion 111_b_. Seawater is moved along the desalination seawater transfer pipe 112 and stored in the evaporation portion 11. The desalination seawater storage tank 70 is connected to a seawater container 71 containing seawater to receive a required amount of seawater from the seawater container 71.

A water level sensor 113 is provided at a middle position of the other side of the side wall portion 111_b_ to check the level of seawater in the evaporation portion 11. When the level of seawater in the evaporation portion 11 is less than or equal to a certain level, the water level sensor 113 may detect this state and allow seawater to be supplied from the desalination seawater storage tank 70 to the evaporation portion 11

A pressure sensor 114 is provided at an upper position of the side of the side wall portion 111_b_ to measure the vapor pressure in the evaporation portion 11.

A gas supply pipe 13 is connected to an uppermost end of the side wall portion 111_b_. The gas supply pipe 13 is connected to the condensation unit 20 such that gas generated in the gas generation unit 10 may move to the condensation unit 20 along the gas supply pipe 13. Here, gas generated in the gas generation unit 10 includes water vapor obtained by evaporating seawater, and other gases such as nitrogen and oxygen contained in the seawater.

A concentrated seawater storage portion 115 is formed on a lowermost end of the side wall portion 111_b_ to store seawater concentrated by evaporation. When seawater continues to evaporate in the evaporation portion 11, the content of water in the seawater reduces and the content of salt or other minerals in the seawater increases, and the seawater concentrated in this manner is stored in the concentrated seawater storage portion 115. The concentrated seawater stored in the concentrated seawater storage portion 115 is moved through a concentrated seawater discharge pipe 72 and stored in a concentrated seawater container 73 according to valve operations. The concentrated seawater is stored in a state in which components of the concentrated seawater are layered according to densities thereof, and workers may extract the concentrated seawater according to the components of the concentrated seawater such as salt and minerals. In this case, the total length of the concentrated seawater storage portion 115 and the concentrated seawater discharge pipe 72 may be about 10.13 m or more, preferably about 13 m, and more preferably about 16 m to about 18 m to allow the concentrated seawater to escape in a vacuum state. The components of the concentrated seawater stored in the concentrated seawater container 73 may be separated from each other through a simple process.

The heat exchange portion 12 includes: a heat exchange pipe 121 having an end inserted into the evaporation body 111 and the other end protruding outward from the evaporation body 111; and a heat source portion 122 filled with a heat source into which the heat exchange pipe 121 is inserted for heat exchange with seawater contained in the heat exchange pipe 121.

The heat exchange pipe 121 includes a plurality of pipes that extend in a horizontal direction and have open ends inside the evaporation body 111 and closed other ends. The inside of the heat exchange pipe 121 is filled with seawater up to a medium height, and the seawater filled in the heat exchange pipe 121 receives heat from the heat source and provides the heat to seawater filled in the evaporation body 111. Specifically, because the evaporation body 111 is connected to the heat exchange pipe 121, seawater is capable of moving in the evaporation body 111 and the heat exchange pipe 121.

The heat source portion 122 includes a plurality of heat source pipes 1221 horizontally extending in a tetragonal loop shape, heat supply pipes 1222 connecting corners of the heat source pipes 1221, and heat-source water filled in the heat source pipes 1221 and the heat supply pipes 1222.

The heat source pipes 1221 and the heat supply pipes 1222 are connected in a lattice shape, forming an overall frame of the seawater desalination equipment 1. The heat source pipes 1221 form a tetragonal loop shape in which upright unit frames are installed at regular intervals in the horizontal direction.

The heat supply pipes 1222 connect the corners of the heat source pipes 1221 to each other, thereby connecting together the heat source pipes 1221 that are apart from each other as a whole. The heat source pipes 1221 and the heat supply pipes 1222 are connected to each other such that the heat-source water may move inside the heat source pipes 1221 and the heat supply pipes 1222.

Four heat supply pipes 1222 are provided on four corners of the heat source pipes 1221, and the heat exchange pipe 121 is inserted into one of the four heat supply pipes 1222 that is located on an upper side. The heat-source water circulates inside the heat source pipes 1221 and the heat supply pipes 1222 while the heat-source water is heated by the sun or ambient temperature, cools and descends by providing heat to seawater as passing through the heat exchange portion 12, and ascends as being heated by the sun or ambient temperature.

The gas supply pipe 13 extends from an upper end of the evaporation body 111 and is connected to the condensation unit 20. Gas in which vapor of seawater and other gases such as nitrogen and oxygen are mixed with each other flows into the condensation unit 20 through the gas supply pipe 13. At this time, after flowing through the gas supply pipe 13, high-temperature, high-humidity gas is converted into low-temperature, low-humidity gas by heat exchange in the condensation unit 20.

The condensation unit 20 receives gas from the gas generation unit 10 and condenses the gas into freshwater. Specifically, high-temperature, high-humidity gas condenses while passing through the condensation unit 20 having a low temperature, forming freshwater on an inner surface of the condensation unit 20. Thereafter, the gas from which most of moisture is removed remains in the condensation unit 20. The condensation unit 20 includes a plurality of condensation pipes 21 disposed upright in a vertical direction and connected to each other in an a "U" shape. In this case, two condensation pipes 21 may be connected in a "U" shape, or if necessary, three or more condensation pipes 21 may be alternately and continuously connected to each other in a zigzag shape in the vertical direction.

A freshwater transfer pipe 22 is connected to lower ends of the condensation pipes 21 to guide condensed water such that the condensed water may flow down to a freshwater storage tank 74.

The freshwater transfer pipe 22 includes a plurality of pipes combined into one, and the overall height of the freshwater transfer pipe 22 may be 10.13 m or more, preferably 13 m, and more preferably 16 m to 18 m. The freshwater transfer pipe 22 is connected to a compensation circuit 23. The compensation circuit 23 supplies gas to the freshwater transfer pipe 22 to facilitate draining of freshwater from the freshwater transfer pipe 22. The compensation circuit 23 is a long extension pipe configured to be connected to a path of the freshwater transfer pipe 22. When air is introduced into the freshwater transfer pipe 22 through the compensation circuit 23, freshwater may escape from the freshwater transfer pipe 22.

The condensation pipes 21 are installed by fixing the condensation pipes 21 to the heat source pipes 1221 that serve as a frame.

Temperature sensors 211 may be respectively provided on the condensation pipes 21. The temperature sensors 211 are respectively installed on the condensation pipe 21 to measure the temperatures of the condensation pipes 21 and determine, based on temperature variations, the amount of gas remaining in the condensation pipes 21. In particular, it is desirable to determine the amount of gas by comparing the internal temperature of a final condensation pipe 21 located at a final position with the internal temperatures of the other condensation pipes 21.

Specifically, gases such as nitrogen and oxygen, excluding steam, do not condense but move along the condensation pipes 21 and accumulate in the condensation pipes 21. The gases accumulated in the condensation pipes 21 act as a factor that hinders condensation, and thus most of the gases remain in the final condensation pipe 21.

When gases accumulate and remain in the more condensation pipes 21 to some extent during a desalination process, the gases hinder vapor condensation and a change from high-temperature, high-humidity gas into low-temperature, low-humidity gas, causing the temperature of the condensation pipes 21 to deviate from a normal level. Thus, when it is determined that temperatures measured by the temperature sensors 211 (for example, the temperature of the final condensation pipe 21) are abnormal, it is necessary to discharge gas from the condensation pipes 21. In this case, a valve 411 is operated to discharge gas from the condensation pipes 21 to the gas storage unit 40 through a gas connection line 41.

The cooling unit 30 lowers the temperature of the condensation unit 20 by evaporating seawater. The cooling unit 30 includes: evaporation seawater supply portions 31 disposed on upper ends of pipes 21*a* to allow seawater to flow down along outer surfaces of the pipes 21*a* in a length direction of the pipes 21*a*; evaporation seawater storage portions 33 disposed on lower ends of the pipes 21*a* to store seawater remaining without undergoing evaporation; and a seawater transfer pipe 34 to discharge seawater stored in the evaporation seawater storage portions 33 to a seawater container 71.

Specifically, the evaporation seawater supply portions 31 causes seawater supplied from the seawater container 71 to flow down from the upper ends to the lower ends of the pipes 21*a*. Seawater supplied through the seawater supply portions 31 flows down along the outer surfaces of the pipes 21*a*.

The evaporation seawater storage portions 33 are provided on the lower ends of the pipes 21*a* to store seawater that flows down from the evaporation seawater supply portions 31 and does not evaporate. When seawater is stored in the anatomical storage portions 33 to a certain extent, the seawater is moved back to the seawater container 71 through the seawater transfer pipe 34.

In addition, evaporation fabric 32 is provided between the evaporation seawater supply portions 31 and the evaporation seawater storage portions 33. The evaporation fabric 32 absorbs seawater supplied through the evaporation seawater supply portions 31 and causes the seawater to evaporate slowly. The evaporation fabric 32 is woven fabric or non-woven fabric having a gauze-like structure to absorb water by capillary action while allowing air to flow.

Seawater absorbed in the evaporation fabric 32 is evaporated by wind or sunlight, lowering the temperature of the condensation pipes 21. Because the condensation pipes 21 are cooled as seawater is absorbed in the evaporation fabric 32 and evaporates, vapor contained in high-temperature, high-humidity gas passing through the condensation pipes 21 may condense on inner surfaces of the condensation pipes 21.

The gas storage unit 40 is connected to the condensation unit 20 and stores gas that has passed through the condensation unit 20. Specifically, the gas storage unit 40 is connected to the condensation unit 20 through the gas connection line 41. The gas connection line 41 is provided with the valve 411 such that when the valve 411 is opened in a situation in which the condensation unit 20 is filled with a sufficient amount of gas, the gas may flow from the condensation unit 20 to the gas storage unit 40 along the gas connection line 41 owing to a pressure difference.

A humidity sensor 42 and a pressure sensor 43 are installed in the gas storage unit 40 to measure the internal humidity and temperature of the gas storage unit 40. In addition, a moisture remover such as sodium hydroxide or calcium chloride is provided in the gas storage unit 40 to absorb moisture not condensed in the condensation unit 20 and remaining in gas such that only dry gas may be stored in the gas storage unit 40.

Specifically, the humidity sensor 42 measures the internal humidity of the gas storage unit 40, and when the internal temperature of the gas storage unit 40 is greater than or equal to a certain level, the moisture remover is replenished. With time, the moisture remover absorbs moisture from gas and turns into a moisture remover solution, and when the amount of the moisture remover solution is greater than or equal to a certain level, the moisture remover solution may be stored in a moisture remover solution storage tank 76 through a moisture remover solution discharge pipe 75 provided at a lower side. Because the inside of the gas storage unit 40 is almost in a vacuum state, the moisture remover solution discharge pipe 75 must extend vertically at least 10.13 m, preferably 13 m, and more preferably 16 m to 18 m.

The pressure sensor 43 measures the internal pressure of the gas storage unit 40. When the amount of gas filled in the gas storage unit 40 is greater than or equal to a certain level, gas is not introduced into the gas storage unit 40 from the condensation unit 20 even though the value 411 is operated, and thus, the control unit 60 operates the vacuum pump 50 after checking a pressure measured by the pressure sensor 43.

When the internal pressure of the gas storage unit 40 is maintained less than or equal to a certain level, gas may be introduced from the condensation unit 20 to the gas storage unit 40 only by opening the value 411 owing to an internal gas pressure difference between the gas storage unit 40 and the condensation unit 20.

The vacuum pump 50 is used to discharge gas stored in the gas storage unit 40 to the outside of the gas storage unit 40. The vacuum pump 50 is connected to the gas storage unit 40, and operations of the vacuum pump 50 are controlled by the control unit 60. When the internal gas pressure of the gas storage unit 40 increases to a level similar to the internal gas pressure of the condensation unit 20, the control unit 60 determines that the gas storage unit 40 is sufficiently filled with gas such as nitrogen and oxygen, and then, the control unit 60 operates the vacuum pump 50 to discharge the gas from the gas storage unit 40 to the outside. Then, when the internal gas pressure of the gas storage unit 40 reduces to a certain level or less, gas may easily be introduced from the condensation unit 20 to the gas storage unit 40.

The seawater desalination equipment 1 of the present disclosure has the following effects.

Seawater contained in the seawater container 71 flows to the gas generation unit 10 through a desalination seawater storage tank 70. At this time, the seawater exchanges heat with a heat source and evaporates into gas in the gas generation unit 10, and the gas flows to the condensation unit 20.

The temperature of the gas introduced into the condensation unit 20 is maintained low by the cooling unit 30, and thus, vapor in the gas is condensed on the inner surface of the condensation unit 20 and then stored in the freshwater storage tank 74 through the freshwater transfer pipe 22. At this time, the cooling unit 30 is operated using the evaporation of seawater contained in the seawater container 71. That is, seawater is supplied to the evaporation fabric 32 wrapped around the outer surface of the condensation unit 20, and the temperature of the condensation unit 20 is lowered during the process of evaporation of the seawater, thereby having a cooling effect on the condensation unit 20. During the cooling process, seawater that is not absorbed in the evaporation fabric 32 flows back to the seawater container 71.

In addition, as gas accumulate in the condensation unit 20 to some degree or more with time, the internal temperature of the condensation unit 20 varies, and the control unit 60 detects this temperature variation and opens the value 411 to move the gas from the condensation unit 20 to the gas storage unit 40 by a pressure difference therebetween (the gas moves from the condensation unit 20 having a high pressure to the gas storage unit having a near-vacuum pressure). Moisture contained in the gas introduced into the gas storage unit 40 is removed by the moisture remover, and thus, only dry gas accumulates in the gas storage unit 40. When the internal pressure of the gas storage unit 40 is substantially equal to the internal pressure of the condensation unit 20 as gas fully accumulates in the gas storage unit 40, gas does not move from the condensation unit 20 to the gas storage unit 40 even though the valve 411 is opened. Then, the control unit 60 operates the vacuum pump 50 to discharge the gas from the inside of the gas storage unit 40 to the outside of the gas storage unit 40, thereby adjusting the pressure of the gas storage unit 40 to be lower than the pressure of the condensation unit 20.

In addition, when the moisture remover absorbs moisture and turns into a sufficient amount of a moisture remover solution, the valve 411 is opened to discharge the moisture remover solution to the moisture remover solution storage tank 76.

The seawater desalination equipment 1 of the present disclosure may have high energy efficiency because most processes such as seawater transfer, seawater heating, seawater condensation, and cooling of the condensation unit 20 are performed by intactly using natural energy such as external temperature, wind, or sunlight.

In addition, as the water component of seawater evaporates, the seawater concentrates and accumulates in the concentrated seawater storage portion 115 according to the components of the seawater, and salt and minerals stored in the concentrated seawater storage portion 115 may be easily extracted and used. Therefore, marine pollution caused by concentrated seawater dumped into the sea in the related art may not occur.

In addition, gas contained in vapor, which hinders the condensation of seawater vapor, is discharged to the outside through the vacuum pump 50. In this case, the vacuum pump 50 is selectively operated only when the internal pressure of the gas storage unit 40 is greater than or equal to a certain level, and only gas from which moisture is removed is discharged using the vacuum pump 50. Thus, the vacuum pump 50 may not be heavily burdened and may incur low maintenance costs owing to a short operation time.

As described above, according to the present disclosure, maintenance costs may be reduced, and owing to the structure of separately collecting concentrated seawater, salt and minerals may be easily separated from the concentrated seawater and sold to make a profit. Therefore, costs may be reduced.

While preferred embodiments of the present disclosure have been shown and described above, the present disclosure is not limited to the embodiments or modified examples thereof, and various other modifications and variations may be made without departing from the scope of the present disclosure.

The invention claimed is:

1. Seawater desalination equipment comprising:
- a gas generation unit configured to evaporate seawater to generate a mixed gas comprising water vapor and at least one non-condensable gas;
- a condensation unit configured to receive the mixed gas and to condense the water vapor to generate freshwater, the condensation unit comprising a plurality of condensation pipes disposed upright in a vertical direction and connected to each other in a U-shape such that the mixed gas passes through the plurality of condensation pipes;
- a cooling unit configured to lower a temperature of the condensation unit by supplying seawater to outer surfaces of the plurality of condensation pipes and evaporating the supplied seawater;
- a gas storage unit connected to the condensation unit through a gas connection line provided with a valve, the gas storage unit configured to store gas remaining after condensation in the condensation unit;
- a vacuum pump configured to discharge gas stored in the gas storage unit to an outside area;
- a plurality of temperature sensors provided on the plurality of condensation pipes and configured to measure temperatures of the plurality of condensation pipes; and
- a control unit configured to:
  - determine accumulation of the at least one non-condensable gas in the condensation unit based on temperature variations detected by the plurality of temperature sensors, by determining that the non-condensable gas has accumulated when a temperature of a final condensation pipe is higher than temperatures of other condensation pipes;
  - open the valve, in response to the determined accumulation, to allow gas remaining in the condensation unit to flow to the gas storage unit; and
  - operate the vacuum pump to discharge gas from the gas storage unit to the outside area.

2. The seawater desalination equipment of claim 1, wherein the plurality of temperature sensors are respectively provided on each of the plurality of condensation pipes.

3. The seawater desalination equipment of claim 2, wherein the at least one non-condensable gas comprises nitrogen and oxygen.

4. The seawater desalination equipment of claim 1, wherein the cooling unit comprises:
- an evaporation seawater supply portion disposed at an upper end of each of the plurality of condensation pipes to allow the seawater to flow down along an outer surface of the pipe in a length direction of the pipe;
- an evaporation seawater storage portion disposed at a lower end of each of the plurality of condensation pipes to store remaining seawater that did not evaporate; and
- a seawater transfer pipe configured to transfer seawater stored in the evaporation seawater storage portion to a seawater storage tank.

5. The seawater desalination equipment of claim 4, further comprising evaporation fabric wrapped around the outer surface of the pipe between the evaporation seawater supply portion and the evaporation seawater storage portion to absorb seawater supplied from the evaporation seawater supply portion.

6. The seawater desalination equipment of claim 1, wherein the gas generation unit comprises:
- an evaporation portion in which the seawater evaporates;
- a heat exchange portion configured to exchange heat with a heat source to provide heated seawater to the evaporation portion; and
- a gas supply pipe configured to provide steam generated in the evaporation portion to the condensation unit.

7. The seawater desalination equipment of claim 6, wherein the evaporation portion comprises:
- an evaporation body in which a receiving space is formed to receive the seawater and having a side into which the heat exchange portion is inserted; and a water level sensor configured to measure a seawater level inside the evaporation body,
- wherein the heat exchange portion comprises:
  - a heat exchange pipe having an end inserted in the evaporation body and another end protruding outward from the evaporation body; and
  - a heat source portion into which the heat exchange pipe is inserted, the heat source portion being filled with the heat source that exchanges heat with seawater contained in the heat exchange pipe.

8. The seawater desalination equipment of claim 7, wherein a concentrated seawater storage portion is connected to a lower portion of the evaporation body to store seawater concentrated by evaporation.

9. The seawater desalination equipment of claim 7, wherein the heat source portion comprises:
- a plurality of heat source pipes horizontally extending in a loop shape; a heat supply pipe connecting corners of the plurality of heat source pipes to each other; and
- heat-source water filled in the plurality of heat source pipes and the heat supply pipe,
- wherein the heat exchange pipe is inserted in the heat supply pipe.

10. The seawater desalination equipment of claim 1, wherein a moisture remover is provided in the gas storage unit to remove only moisture from the gas.

11. The seawater desalination equipment of claim 10, wherein the gas storage unit comprises a moisture remover solution discharge pipe to discharge a moisture remover solution in which the moisture is absorbed.

12. The seawater desalination equipment of claim 1, further comprising:
- a pressure sensor provided in the gas storage unit and configured to measure an internal pressure of the gas storage unit,
- wherein the control unit is further configured to:
  - when gas accumulated in the gas storage unit causes the internal pressure of the gas storage unit to rise such that a pressure difference between the condensation unit and the gas storage unit becomes less than a predetermined value, operate the vacuum pump to discharge gas from the gas storage unit to the outside area.

13. The seawater desalination equipment of claim 1, wherein a freshwater transfer pipe is connected to a lower end of each of the plurality of condensation pipes to transfer the freshwater to a freshwater storage tank.

* * * * *